US012669808B2

(12) United States Patent
Lutz

(10) Patent No.: US 12,669,808 B2
(45) Date of Patent: Jun. 30, 2026

(54) OPERATING METHOD AND OPERATOR-SUPPORTING CONTROL SYSTEM FOR A TECHNICAL PLANT

(71) Applicant: Siemens Aktiengesellschaft, Munich (DE)

(72) Inventor: Benjamin Lutz, Pfinztal (DE)

(73) Assignee: Siemens Aktiengesellschaft, Munich (DE)

( * ) Notice: Subject to any disclaimer, the term of this patent is extended or adjusted under 35 U.S.C. 154(b) by 345 days.

(21) Appl. No.: 18/239,274

(22) Filed: Aug. 29, 2023

(65) Prior Publication Data

US 2024/0069530 A1 Feb. 29, 2024

(30) Foreign Application Priority Data

Aug. 31, 2022 (EP) .................................... 22193169

(51) Int. Cl.
*G05B 19/418* (2006.01)

(52) U.S. Cl.
CPC .................. *G05B 19/41835* (2013.01); *G05B 2219/31449* (2013.01)

(58) Field of Classification Search
None
See application file for complete search history.

(56) References Cited

U.S. PATENT DOCUMENTS

| | | | | |
|---|---|---|---|---|
| 2003/0097189 A1* | 5/2003 | Melzer | ............... | G05B 19/0428 |
| | | | | 700/83 |
| 2018/0109955 A1* | 4/2018 | Nixon | ..................... | H04L 65/70 |
| 2019/0102068 A1* | 4/2019 | Naidoo | ................... | G06F 11/32 |

FOREIGN PATENT DOCUMENTS

| | | | | |
|---|---|---|---|---|
| EP | 3637205 | 4/2020 | | |
| EP | 3876046 | 9/2021 | | |
| WO | WO-2020187818 A1 * | 9/2020 | ........... | G05B 19/408 |

OTHER PUBLICATIONS

Siemens, "SIMATIC PCS 7 Process Control System", Mar. 2007, Siemens AG Catalog ST PCS 7, pp. 4/14-4/15 (Year: 2007).*
Siemens, "Operator system Safe and user-friendly process control with the SIMATIC PCS 7 Operator System", 2013, Siemens AG, pp. 1-8 (Year: 2013).*

* cited by examiner

*Primary Examiner* — David Earl Ogg
(74) *Attorney, Agent, or Firm* — Cozen O'Connor

(57) ABSTRACT

Control system and method for a technical plant, in particular a production or process plant, includes an operator station server and an operator station client connected to the operator station server, wherein the operator station client, at runtime of the plant, receive an instruction specified by the operator for an operator activity relating to the plant and a condition specified by the operator and which relates to an internal state of the plant for the instruction and transmit them to the operator station server, and the operator station server stores the instruction and condition received from the operator station client in memory and checks whether the condition is met, such that operators can adapt flexibly and efficiently to the operation and monitoring of the plant, particularly if it is formed in a modular manner for plant configurations that change during its life cycle.

20 Claims, 6 Drawing Sheets

OPERATING METHOD AND OPERATOR-SUPPORTING CONTROL SYSTEM FOR A TECHNICAL PLANT

BACKGROUND OF THE INVENTION

1. Field of the Invention

The invention relates to a control system for a technical plant, in particular a production or process plant, and relates to a method for operating the control system.

2. Description of the Related Art

For the operation and monitoring of large industrial processing plants, operators (i.e., the people who operate and monitor the plant) are offered symbolic plant images representing industrial processing relationships—in particular between objects of a process running in the plant (hereinafter referred to as "process objects")—in abstracted form.

Plant images consist, for example, of static symbols (for example, lines, rectangles, etc.), dynamized symbols (for example, in dependence on process values, lines with color changes, and/or rectangles with filling levels), block symbols (for dynamized visualization of industrial processing process objects), complex controls (for example, trend displays or message sequence displays etc.) and containers to enable visualization of contents from independent and standalone sources (for example, plant images of modular plant parts (package units), apps (for example, controller optimizers, KPI calculations)) together.

Even if plant images with their contents have been created efficiently for operators, operation and monitoring is often difficult because the industrial processing relationships are very complex.

EP 3 876 046 A1 discloses an exemplary a control system for a technical plant that enables an operator to adjust a presentation of visualization information made by an operator station client at runtime of the technical plant so as to simplify operation and monitoring. For example, the operator can make changes or adjustments to a plant image, i.e., a graphical representation of the plant or its components, by selecting trend displays and/or message sequences. A change of this kind is referred to as a "user selection".

EP 3 637 205 A1 discloses a control system for a technical plant in which, at runtime of the technical plant, operator information specified by a first operator of an operator station client connected to an operator station server is stored in memory such that this information can be retrieved and used to configure an image display for a second operator of a second operator station client.

These solutions already provide very good support to the operator in the operation and monitoring of the plant. However, due to the high complexity of industrial processing relationships, operators still have further challenges to face. For example, to deal with an alarm, it is often necessary to check a plurality of process objects in different documents for certain states in order to take the logically consistent action on the appropriate objects. Apart from experience, this requires detailed documentation that is always up-to-date and available at all times. However, this cannot always be guaranteed with the prior art.

In particular, the trend toward flexible plant structures through modularization via package units (for example, the module type packages (MTPs) developed within the framework of the User Association of Automation Technology in Process Industries (NAMUR)) with the possibility of dynamically and partially reconfiguring the industrial processing process during the life cycle of the plant, poses new challenges for operators with regard to flexibility and efficiency during operation and monitoring of the plant.

SUMMARY OF THE INVENTION

In view of the foregoing, it is an object of the present invention to provide a control system and a method for operating the control system for a technical plant which enables an operator to operate and monitor the plant even more flexibly and efficiently.

This and other objects and advantages are achieved in accordance with the invention by a control system for a technical plant, where the control system for the technical plant, in particular a production or process plant, comprises at least one operator station server and at least one operator station client connected to the operator station server, where the operator station server is configured to transmit visualization information to the operator station client, and where the operator station client is configured to use the visualization information to generate a graphical presentation for an operator of the technical plant. Here, the operator station client is configured, at runtime of the plant, to receive an instruction that can be specified by the operator for an operator activity relating to the plant and a condition for the instruction that can be specified by the operator relating to an internal state of the plant and to transmit them to the operator station server, and the operator station server is configured to store the instruction and condition received from the operator station client in a memory and to check (preferably in an automated manner) whether the condition is met.

Hence, at runtime of the plant and taking into account the configuration of the system at a certain point in time in the life cycle of the plant, the operator thus has the option to use the operator station client to flexibly define instructions for operator activities and a condition for the instruction in the control system and store them in the memory. The operator station server can then check during the operation of the plant (preferably in an automated manner, or, for example, on operator initiation) whether the condition is met.

In the event of the condition being met, the instruction can be output directly to the operator. Alternatively, in a first step, only a notification of the existence of an instruction can be output to the operator, who, based on this, can then initiate output of the instruction in a second step if required.

Hence, the operator (or other operators) can be provided with detailed documentation that is always up-to-date and available at all times and can be used as the basis for implementing logically consistent actions on appropriate objects of the plant. This enables sequences, routine actions, settings, cyclical checks, dealing with alarms, etc. to be documented, coordinated and optimized even more efficiently. As a result, operators can adapt even more flexibly and efficiently to the operation and monitoring of complex industrial processing plants, in particular if they have a modular design for plant configurations that change during the life cycle.

Examples of instructions for operator activities are checking instructions and action instructions, such as (i) check whether the filling level in a tank exceeds a specific height, if it is below this height, close a drain valve or (ii) check whether the flow in a pipe is below a specific value, if it exceeds this value, open an inlet valve.

The instructions or the operator activities can then support the operator by guided interaction with the control system during operation and monitoring of the plant (for example, when dealing with alarms). The operator is prompted by the instructions to interact with the control system or the plant, such as to avoid or rectify technical malfunctions in the plant.

Herein, the condition for the instruction relates to an internal state prevailing in the plant. This internal state can, for example, relate to an operating state of the entire plant or merely a technical object of the plant, an alarm, a parameter change in a technical object of the plant, reaching a specific state of a step sequence to be processed by the plant or reaching a specific quality criterion during the operation of the plant.

The memory can be a memory of the control system or a cloud-based memory outside the control system. Herein, the memory is preferably a memory area of an operator station server of the control system.

The technical plant can be a plant from the process industries, for example a chemical, pharmaceutical, petro-chemical plant, or a plant from the food and beverage industries. This also includes any types of plants from the production industries, factories in which, for example, auto-mobiles or goods of any kind are produced. The technical plants can also come from the field of power generation. Wind turbines, solar plants or power plants for power generation are also covered by the term technical plant.

In the present context, a control system should be under-stood to be a computer-aided technical system with func-tionalities for displaying, operating and controlling the tech-nical processing plant. The control system can also comprise sensors for ascertaining measured values and various actua-tors. In addition, the control system can comprise "process-oriented" or "production-oriented" components that serve to actuate the actuators or sensors. Moreover, the control system inter alia has means for visualizing the technical plant and for engineering. The control system can optionally also comprise further computing units for more complex control systems and systems for data storage and data processing.

In the present case, an "operator station server" should be understood to be a server that centrally acquires data from an operating and monitoring system and, as a rule, alarm and measured value archives of a control system of a technical plant and makes the data available to users. As a rule, the operator station server establishes a communication link to automation systems of the technical plant and forwards data from the technical plant for visualization to "operator station clients" that serve to operate and monitor operation of the individual functional elements of the technical plant. The operator station server can have client functions to access data (archives, messages, tags, variables) from other opera-tor station servers. This enables images of an operation of the technical plant on the operator station server to be combined with variables from other operator station servers (server-server communication). The operator station server can be, but is not limited to, a SIMATIC PCS 7 Industrial Workstation server made by SIEMENS.

An operator of the technical plant can access the operator station server via the operator station client, which can, for example, be a tablet, a smartphone, a personal computer, or a computer with a large-screen display in a control room, for the purpose of operating and monitoring the technical plant.

In the present context, visualization should be understood to be the graphical presentation to the operator by the operator station client. As a rule, the operator station client has corresponding functionalities to use relevant visualization information, which it receives from the operator station server, to generate the intended visualization.

Herein, visualization can generally comprise, in a manner known per se, a graphical display of a plant image of the technical plant, graphical windows with progress displays of measured values (for example, trend displays) of the tech-nical plant, message displays, graphical objects representing technical objects of the technical plant, and/or text fields for operator inputs, such as for manipulated variables of a controller. In the case of a process plant, the plant image can, for example, comprise graphical representations of pumps, valves, tanks, pipelines, and/or combustion chambers. Herein, the graphical representations can comprise current process measured values, status values, and/or (alarm) mes-sages.

Herein, the instruction advantageously relates to objects (for example, process objects) and/or documents (for example, plant images, step sequences) of the plant that can be specified by the operator at runtime of the plant. Prefer-ably, for this purpose, the operator can select objects and/or documents (for example, from a technological hierarchy stored in the control system which is kept up-to-date at all times) and then define and store instructions for operator activities for them.

In accordance with an advantageous embodiment, the operator station server is configured, in the event of the condition being met, to modify the visualization information such that the operator station client outputs the instruction as a graphical presentation. In other words, the operator is then presented with the instruction directly by the operator station client.

Alternatively, however, the operator station server can also be configured, in the event of the condition being met, to modify the visualization information such that the opera-tor station client outputs a notification of the instruction as a graphical presentation. Hence, the operator is not pre-sented with the instruction directly by the operator station client, but, in a first step, the operator only receives a notification of the existence of an instruction, and can then, based on this, initiate (direct) output of the instruction in a second step if necessary.

For the second step, the operator station client is prefer-ably configured to receive a prompt from the operator for an output of the instruction and to transmit it to the operator station server, and the operator station server is configured, after receipt of the prompt, to modify the visualization information such that the operator station client outputs the instruction as a graphical presentation.

In accordance with a further advantageous embodiment, the graphical presentation comprises a plant image with graphical representatives of objects of the technical plant. Hence, the operator can see the instruction with direct reference to an image of the current plant configuration and hence be supported particularly efficiently during operation and monitoring.

Herein, the condition represents an event or a logical combination of a plurality of events. An event can, for example, be a parameter change in a technical object of the plant, an operating state of a technical object of the plant, reaching a specific state of a step sequence to be processed by the plant or reaching a specific quality criterion during the operation of the plant.

Preferably, an event represents an occurrence of an alarm. The alarm then preferably relates to an object (for example, a process object) of the plant that can be specified by the operator at runtime of the plant. For this purpose, the operator can preferably define paths from a current technological hierarchy of the plant that are, for example, defined via process objects, and associate these paths with instructions for operator activities. If an alarm subsequently occurs in the technological hierarchy below the alarm paths, then an instruction for an operator activity is output that describes which documents and objects and which procedure can be used to deal with the alarm.

The objects and advantages in accordance with the invention are also achieved by a method for operating a control system of a technical plant, in particular a production or process plant, which comprises at least one operator station server and at least one operator station client, where the operator station server is configured to transmit visualization information to the operator station client, and where the operator station client is configured to use the visualization information to generate a graphical presentation for an operator of the technical plant. In accordance with the invention, the method comprises a) receiving, from an operator of the technical plant, an instruction for an operator activity relating to the plant and a condition for the instruction by the operator station client, where the condition relates to an internal state of the plant, b) transmitting the instruction and the condition from the operator station client to the operator station server, c) storing the instruction and the condition in a memory, and d) checking that the condition is met by the operator station server.

In accordance with an advantageous embodiment, the instruction relates to objects (for example, process objects) and/or documents (for example, plant images, step sequences) of the plant that can be specified by the operator at runtime of the plant.

In accordance with a further advantageous embodiment, in the event of the condition being met, the operator station server modifies the visualization information such that the operator station client outputs the instruction (directly) as a the graphical presentation.

In accordance with yet a further advantageous embodiment, in the event of the condition being met, the operator station server modifies the visualization information such that the operator station client outputs a notification of the instruction as a graphical presentation.

The operator station client then advantageously receives a prompt from the operator for an output of the instruction and then transmits this to the operator station server, where, after receipt of the prompt, the operator station server modifies the visualization information such that the operator station client outputs the instruction (directly) as a graphical presentation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and further advantageous embodiments of the invention according to features in the subclaims are explained in more detail below with reference to exemplary embodiments in the figures, in which:

DETAILED DESCRIPTION OF THE EXEMPLARY EMBODIMENTS

Figure 1:
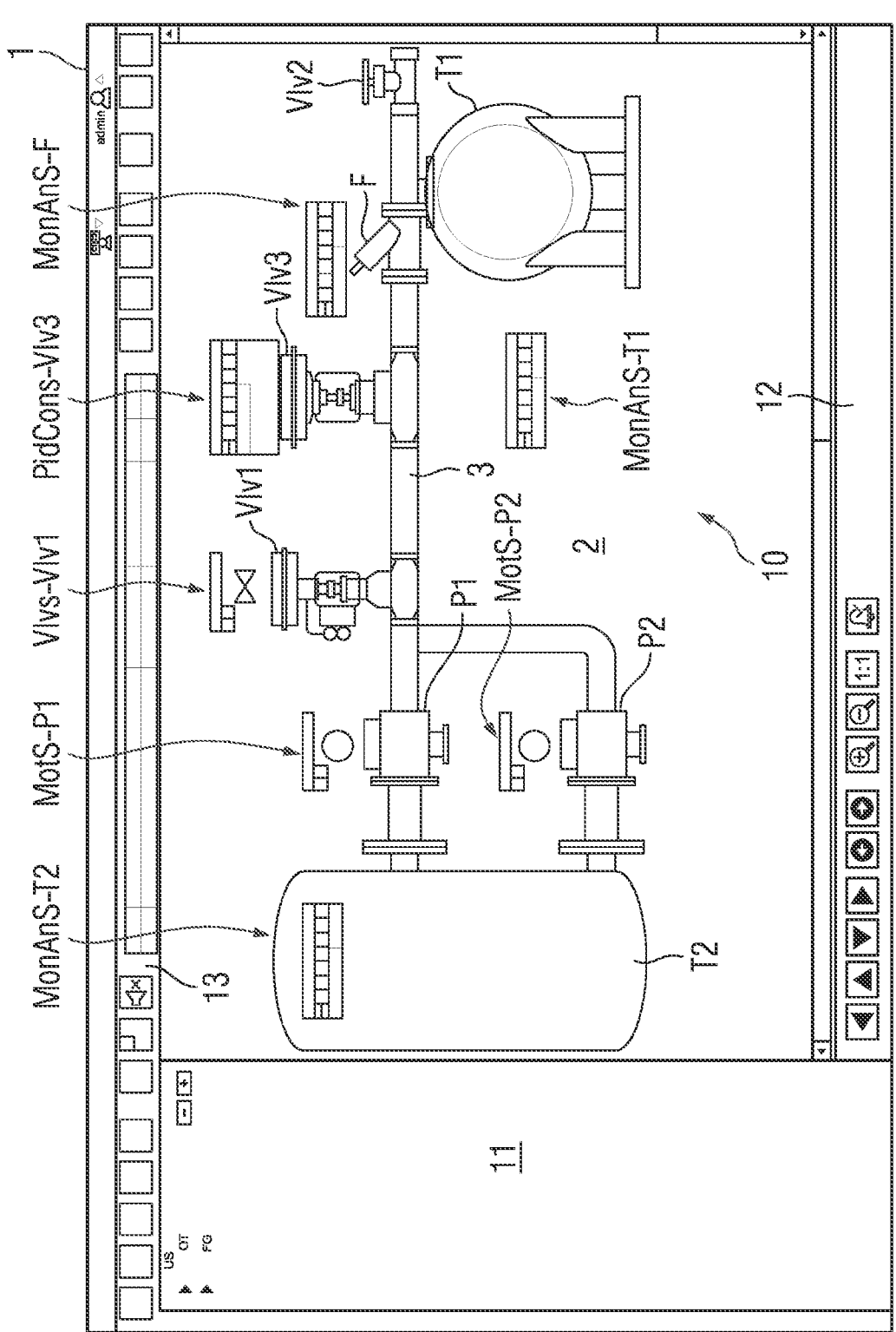
FIG. 1 shows an operator visualization for operating and monitoring a plant on an operator station client in accordance with the invention.

FIG. 1 depicts a visualization or graphical presentation 1 that an operator station client (cf. FIG. 6) presents to an operator of a process plant for operating and monitoring the process plant.

The graphical presentation 1 comprises a plant visualization 10 as a central component. Furthermore, graphical presentation 1 comprises a user selection view 11 in the left-hand area, an operator control panel 12 in a lower area and an alarm panel 13 in an upper area.

The plant visualization 10 comprises a plant image 2 with graphical representations of pipelines 3 and process objects, such as tanks or boilers T1, T2, pumps P1, P2, valves Vlv1, Vlv2, Vlv3 and flow meters F. Furthermore, the plant image comprises graphical representations of associated measuring, controller or actuator modules such as, for example, MonAnS-T1 (monitoring module for an analog measured value of the filling level in the tank T1), MotS-P1 (actuator module for pump motor P1), PidCons-Vlv3 (PID controller module for controllable valve Vlv3) or Vlvs-Vlv1 (valve actuator module for valve Vivi) in each case with an output of associated current process measured values, status values, and/or (alarm) messages. The plant visualization 10 can furthermore comprise, for example, faceplates, trend curves for measured values and alarm message displays.

Herein, the plant visualization 10 can be generated individually by the operator with regard to current operating and monitoring tasks, which in turn depend on the current state of the plant.

A number of operator inputs are possible for opening, selecting and positioning the different visualization objects; these can, for example be performed via a graphical user interface and user dialogs enabled by the operator station client or the graphical presentation or visualization 1 output thereon. Such an individual generation of a graphical presentation or visualization is an example of "user selection".

In the user selection view 11, information on operator-stored user selections US is displayed visually to the operator for later retrieval. These include, for example, online trends OT or faceplate groups FG.

As will be explained with reference to FIGS. 2-6, the user selections are now expanded by a new category of "operator activities" OA in order to support the operator in flexible and efficient operation and monitoring of the plant. The operator can then, at runtime of the plant, define instructions for operator activities in relation to the plant and define a condition relating to an internal state of the plant for an output of the instruction in the graphical presentation 1. The operator activities can, for example, relate to checks, settings, changes to parameters, and/or changes to operating states of technical objects of the plant.

If the condition is met, then the instruction is output in the graphical presentation 1 directly or indirectly, thereby supporting and guiding the operator in the operation and monitoring of the plant, which is explained in detail with reference to the sequence of the method 20 shown in FIG. 2.

Figure 2:
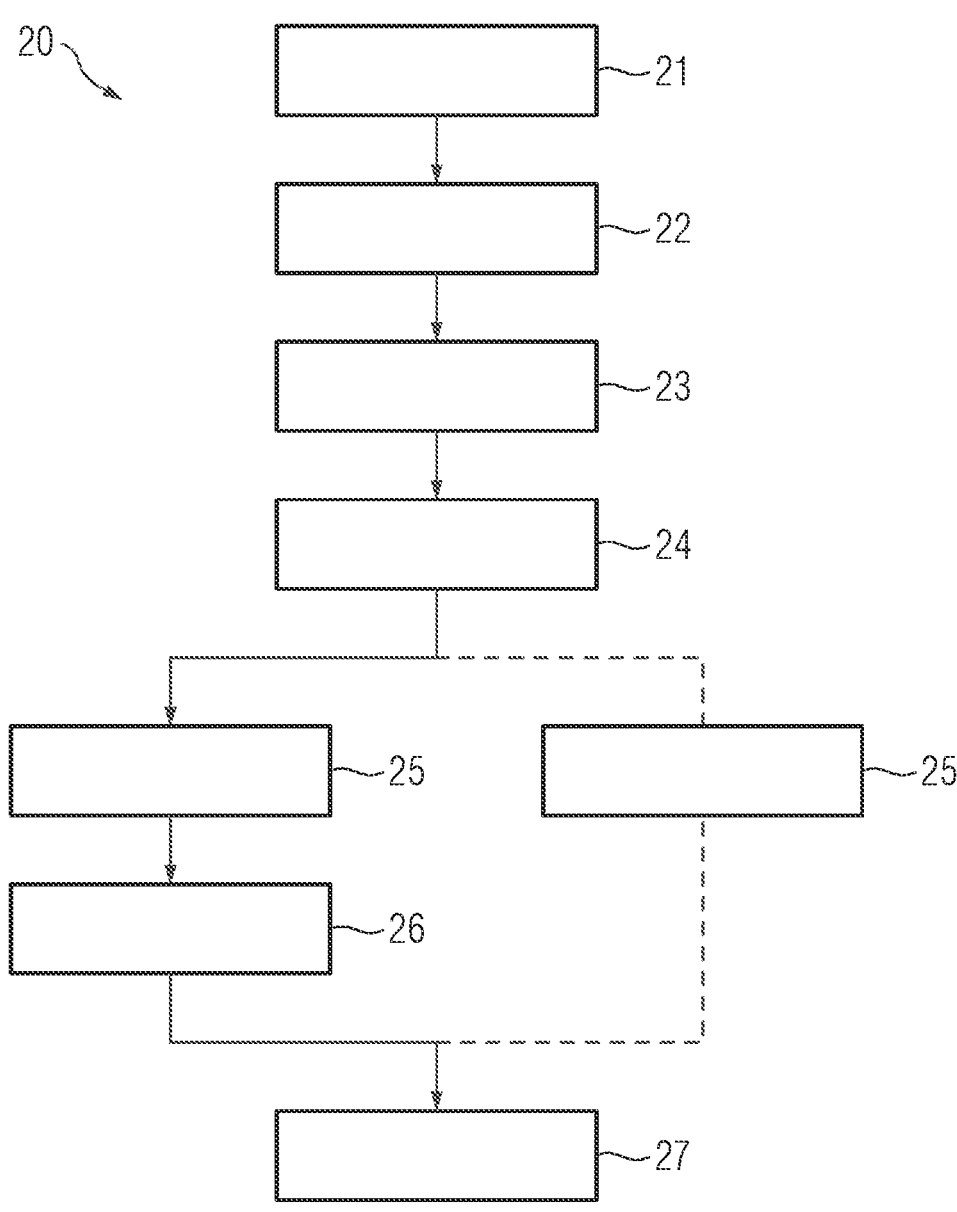
FIG. 2 shows a flowchart of the method in accordance with the invention.

With reference to FIG. 2, in a first step 21, the operator station client 61 (see FIG. 6) receives, from an operator, an instruction for an operator activity relating to the plant and a condition for the instruction relating to an internal state of the plant. The condition or the internal state of the plant is preferably an event or a logical combination of a plurality of events, such as an occurrence of an alarm, an operating state of the entire plant or merely a technical object of the plant, a parameter change in a technical object of the plant, reaching a specific state of a step sequence to be processed by the plant or reaching a specific quality criterion during the operation of the plant.

Figure 6:
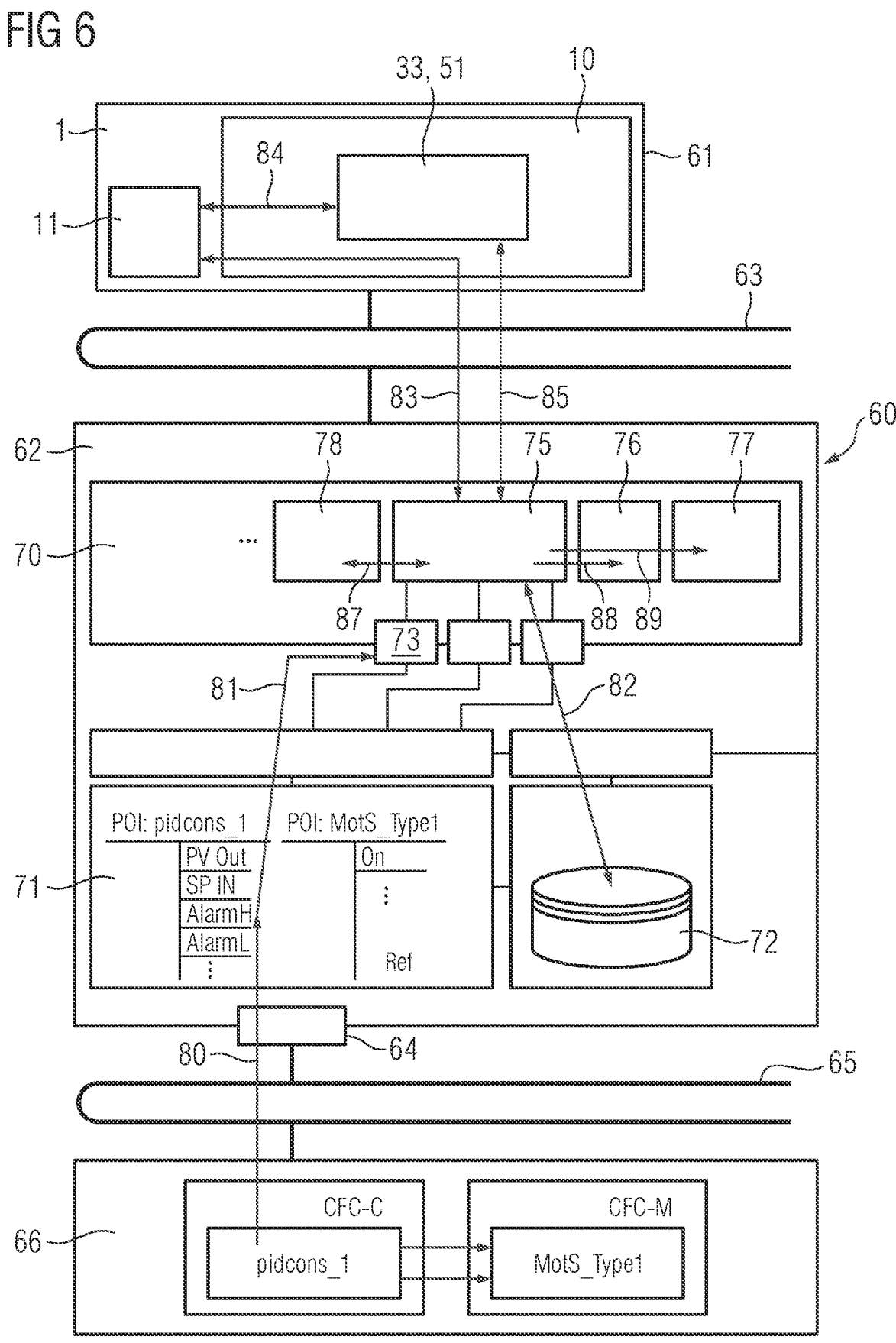
FIG. 6 shows a schematic representation of a control system in accordance with the invention.

In a second step 22, the instruction and the condition from the operator station client 61 are transmitted to an operator station server 62 (see FIG. 6).

In a third step 23, the instruction and the condition are stored in a memory 72 of the operator station servers 62.

In a fourth step 24, the operator station server 62 checks in an automated manner whether the condition is met.

In a fifth step 25, in the event of the condition being met, the operator station server 62 modifies the visualization information such that the operator station client 61 outputs a notification of the instruction as a the graphical presentation.

In a sixth step 26, the operator station client 61 receives a prompt from the operator for an output of the instruction and transmits it to the operator station server 62, where, after receipt of the prompt, the operator station server 62 modifies the visualization information such that the operator station client 61 outputs the instruction as a the graphical presentation 1.

As an alternative to steps 25 and 26, in the event of the condition being met, in a step 25', the operator station server 62 can modify the visualization information such that the operator station client 61 outputs the instruction directly as a graphical presentation 1.

In a seventh step 27, the operator then operates and monitors the plant in accordance with the instructions output and, if necessary, also changes the internal state of the plant as a result.

Figure 3:
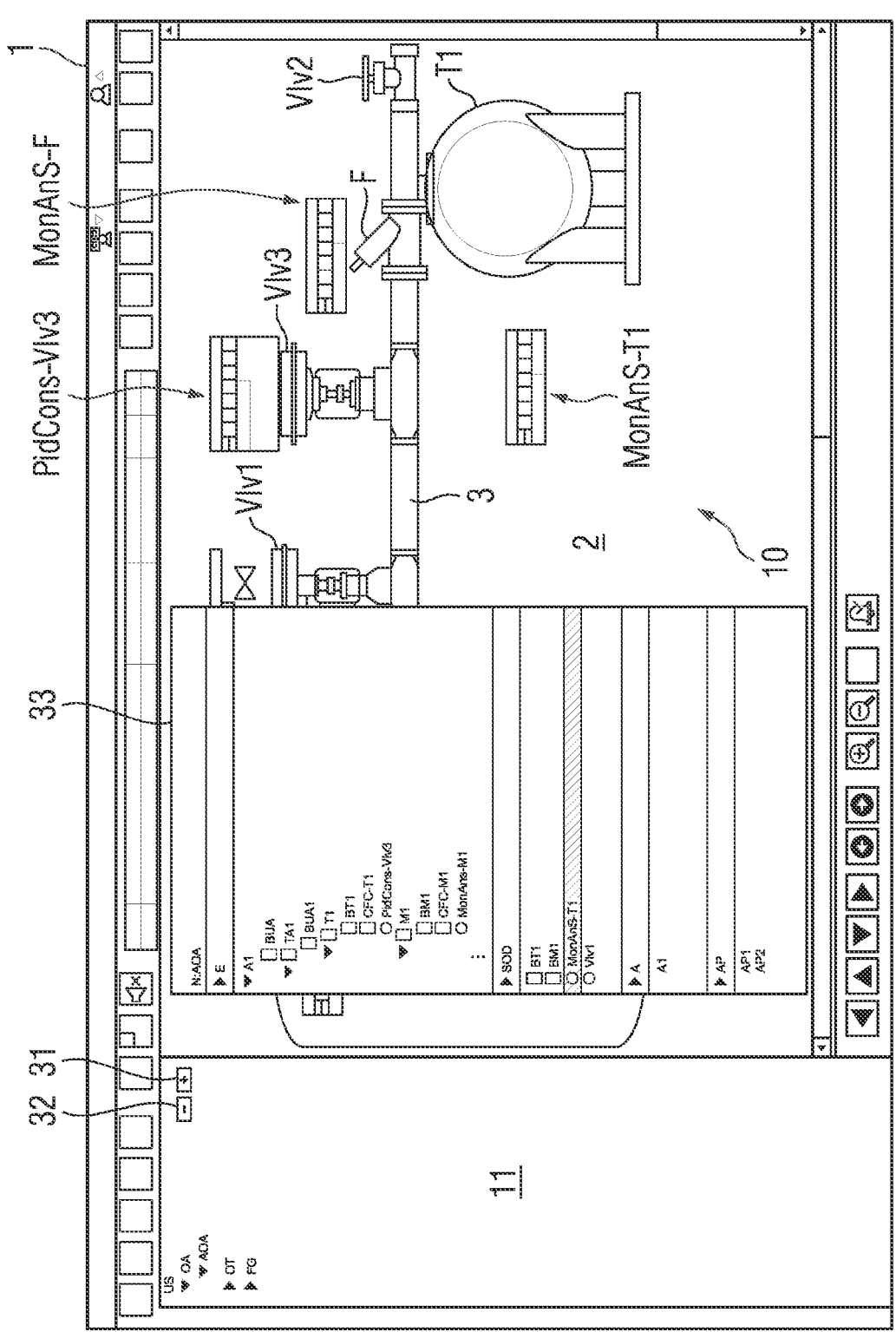
FIG. 3 shows an operator visualization for defining an instruction for an operator activity on an operator station client in accordance with the invention.

As shown in FIG. 3, the user selections in the user selection view 11 in the exemplary embodiment in FIG. 1 have been expanded by the category of operator activities OA. By selecting the "+" field 31, the operator can use this to create new instances of instructions AOA for operator activities and associated conditions for their output at runtime of the plant; selecting the "−" field 32 enables the operator to delete them and selecting the instruction AOA enables them to be edited by the operator.

In the case of the exemplary embodiment in FIG. 3, if the operator creates a new instance of an instruction AOA for an operator activity, a dialog window 33 (operator activity browser) opens in the graphical presentation 1 in which the operator can configure the instruction for the operator activity. For example, the dialog window 33 has the following sections:

a) N(=Name):
Name of the instruction for an operator activity, here AOA (for example, "If tank filling level low")
b) E (=Equipment):
A current technology hierarchy of the plant from which the operator can choose and select objects (for example, process objects), documents (for example, plant images, step sequences, etc.) or paths (for example, plant1/mixer1) for the configuration of the operator activity.

Herein, in FIG. 3, process objects that can be selected by the operator are designated A1, a plant 1, TA1, a plant section TA1 of the plant 1, T1, a tank of the plant section TA1 and M1, a mixer of the plant section T1. PidCons-Vlv3 designates a PID controller module for the controllable valve Vlv3 for controlling the filling level in the tank T1 and MonAnS-M1 designates a monitoring module for an analog measured value relating to the mixer M1. Furthermore, documents that can be selected by the operator are designated BT1, an image of tank T1, CFC-T1, a continuous function chart of the tank T1, BM1, an image of the mixer M1, and CFC-M1, a continuous function chart of the mixer M1 (for the sake of simplicity, the mixer M1 is not shown in the figures).

c) SOD (=Selected Objects and Documents):
A list of objects and documents that the operator compiles for the activity from section E, Equipment, for example as depicted consisting of the image BT1 of the tank T1, the image BM1 of the mixer M1, the analog measured value MonAnS-T1 relating to the tank T1 and the valve Vlv1.

d) A (=Action Instruction):
For each of the objects and documents selected in section SOD, the operator can store action instructions (and possibly further comments, notes, and/or information), here, for example, for the process object MonAnS-T1, an instruction A1 with the text "Check whether filling level of the tank exceeds 400 liters. If it is below this level, close drain valve Vlv2".

In a further section, it is now possible to define and store a condition for the respective instruction. In the exemplary embodiment, it is assumed that the condition represents an event in the form of the occurrence of an alarm. However, as already explained, other conditions or events are possible.

e) AP (=Linked Alarm Paths):
Here, the operator activity can be associated with alarm paths. The alarm paths can be defined and added via Equipment in section E. If an alarm occurs below the alarm paths, then the instruction created for an operator activity describing which objects and documents (i.e., the objects and documents selected in section SOD) and which procedure according to section A can be used to deal with the alarm is output directly or indirectly (via a notification).

Here, two alarm paths AP1 (for example, plant1/plant section1/mixer1) and AP2 (for example, plant1/plant section1/drain1) are depicted by way of example.

Figure 4:
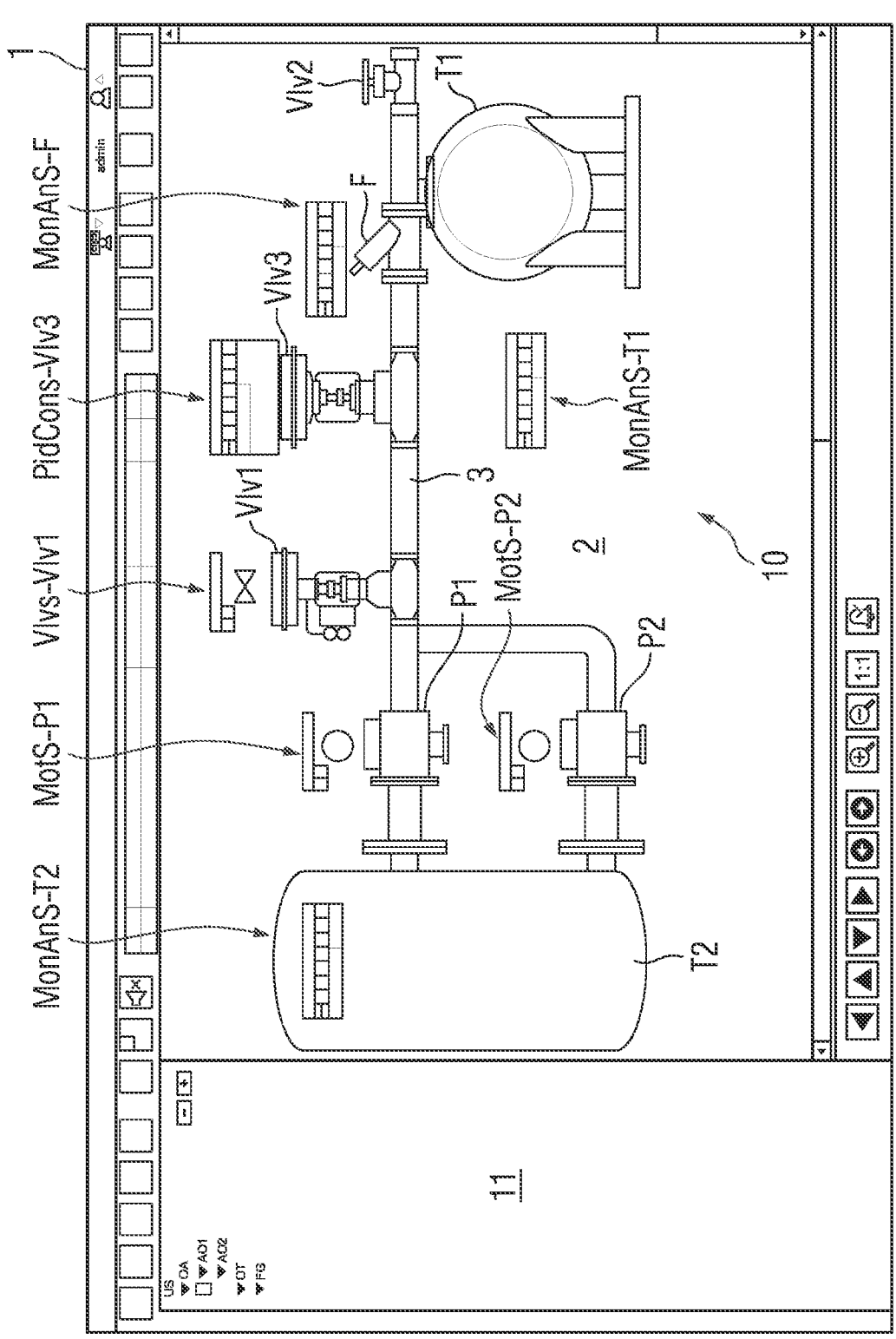
FIG. 4 shows an operator visualization with an output of a notification of the existence of an instruction for an operator activity on an operator station client in accordance with the invention.

If now (as depicted in FIG. 4) an alarm occurs that can be associated by its alarm path with one or more operator activities, then the user selection view 11 is opened in the graphical presentation 1 (only necessary if the tree of user selections is closed and the image hierarchy is depicted instead) and the respective affected user selections for operator activities are highlighted in color. In FIG. 4, the alarm relates, for example, to the monitoring module MonAnS-T1 for an analog measured value of the filling level in the tank T1 and hence to the operator activity AO1.

Figure 5:
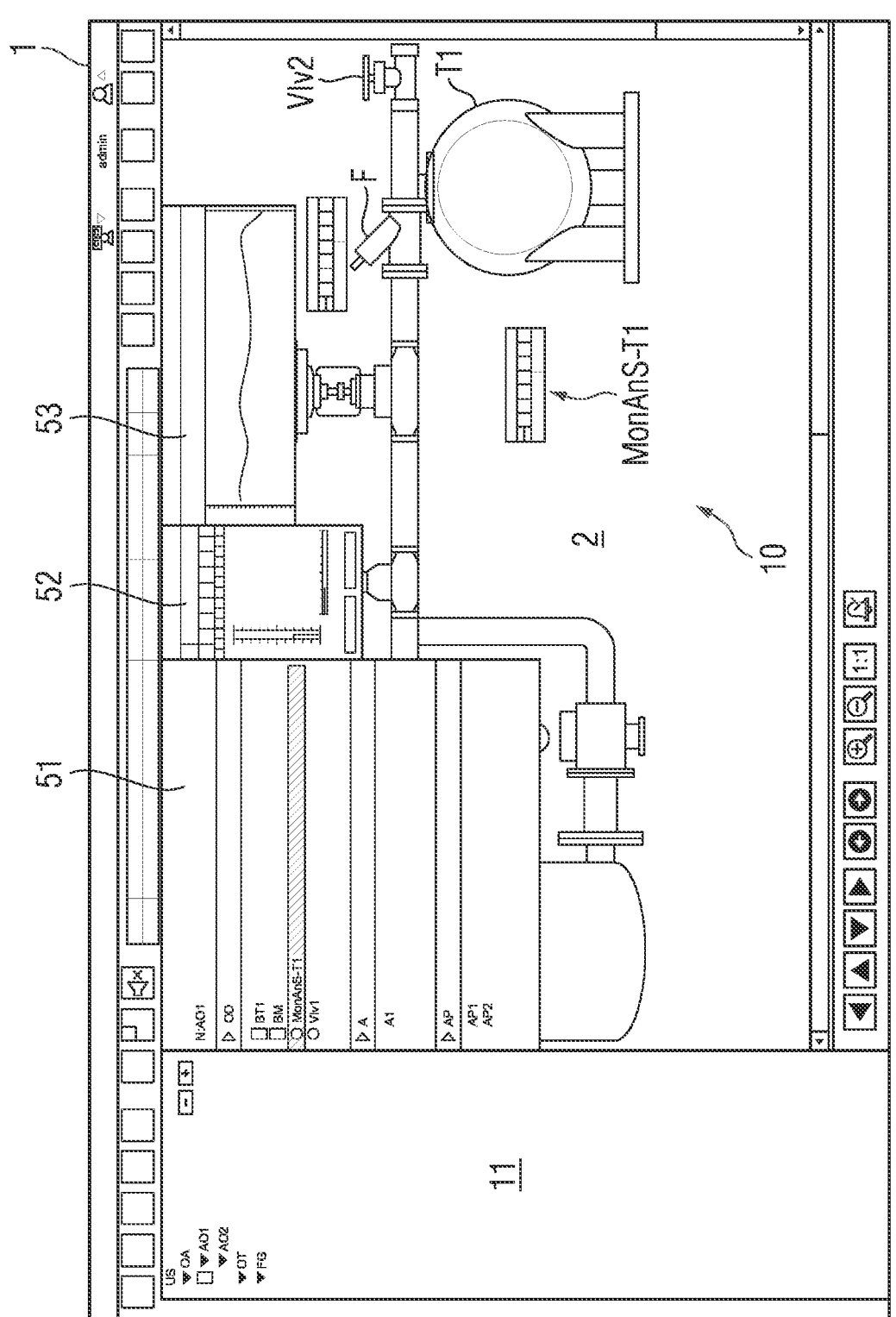
FIG. 5 an operator visualization with an output of an instruction for an operator activity on an operator station client in accordance with the invention.

As depicted in FIG. 5, the operator can now open the operator activity AO1 associated with the alarm (or alarms) for dealing with the alarm in the user selection view 11 and click on the operator activity AO1 to prompt the operator station client 61 to do this. An output window 51 from which the operator can obtain the instruction for the operator activity then opens in the graphical presentation 1. The output window 51 has the following sections, for example:

a) N(=Name):

Name of the instruction for an operator activity, here AO1 (for example, "If tank filling level low")

b) OD (=Objects and Documents):

Objects and documents required to deal with the alarm.

c) A (=Action Instructions):

The respective action instruction for dealing with the alarm for an object or document selected in section OD (here the process object MonAnS-T1), here for example the instruction A1.

Loop-ins are provided for efficient navigation to the objects and documents in section OD so that the operator can, for example, open the faceplate of a process object or open an assigned plant image in an image window directly from the dialog. In the case shown in FIG. 5, the operator can select the object MonAns-T1 in section OD in order, for example, to open a faceplate 52 for the object and a trend profile 53 for the analog process variable.

FIG. 6 is a schematic representation of the control system 60 for the process plant. The control system 60 comprises the aforementioned operator station client 61 and the operator station server 62. The operator station server 62 and the operator station client 61 are connected to one another, and optionally connected to further components of the control system 60 (not shown) such as an engineering station server or an archive server, via a terminal bus.

A user or operator can access the operator station server 62 via the operator station client 61 over the terminal bus 63 for purposes of operating and monitoring. The terminal bus 63 can, without being limited thereto, be formed as an Industrial Ethernet.

The operator station server 62 has a device interface 64 that is connected to a plant bus 65. The operator station server 62 can communicate with an automation device 66 and with optional further components of the industrial processing plant such as peripheral devices (not shown) via this device interface 64. The plant bus 65 can, without being limited thereto, be formed as an Industrial Ethernet.

A visualization service 70, a process output image 71 and a memory 72 are (inter alia) implemented on the operator station server 62. The visualization service 70 integrated in the operator station server 62 initiates the transmission of visualization information to the operator station client 61. The operator station client 61 is embodied to depict the graphical presentation 1, in particular plant images, for operating and observing the process plant.

A snapshot of the (signal) states of devices and/or applications connected to the operator station server 62, here for example of the automation device 66, is stored in the process output image 71 (POI) of the operator station server 62 (illustrated by the arrow 80). For this purpose, the automation device 66 comprises, for example, a continuous function chart CFC-C for a PID controller module "pidcons_1" and a continuous function chart CFC-M for an actuator module "MotS_Type 1" of a pump motor.

An alarm service 73 can read alarm messages from the process output image 71 (as illustrated by an arrow 81) and, for example, generate a graphical aggregation of the alarm messages that the operator station client 61 can present to the operator.

A user selection service 75 has access to the memory 72 (illustrated by an arrow 82) of the operator station server 62.

User profiles and personal settings of operators of the process plant can be stored there. These can also be accessible to other operators.

As described, the user selections are expanded by the new category of "Operator activities" which can be configured and used via the user selection service 75, the user selection view 11 and the dialog window 33 for operator activities (see arrows 83, 84, 85). For this purpose, the user selection service 75 has access to the user selection view 11 via which, as explained with reference to FIG. 2 and FIG. 3, the operator specifies the instructions for operator activities and conditions for the automated output of the instructions in the graphical presentation of the operator station client 61 with the aid of the dialog window 33. After receipt from the operator station client 61, the operator station server 62 stores this data in the memory 72.

For the configuration of the instructions for the operator activities, the user selection service 75 is connected to (associated with) a database 78 in which the current technology hierarchy of the plant is stored (for example, an "equipment hierarchy (EQH) online"), so that, as described, the operator can select objects, documents and paths in the dialog window 33. This is illustrated by the arrow 87.

In order to be able to open objects or documents from an operator activity, the user selection service 75 is furthermore connected to the DCS DL 76 (for process objects, step sequences, etc.) and the display hierarchy (BL) 77 as illustrated by the arrows 88, 89. "DCS DL" stands for distributed control system domain logic. This dynamizes industrial processing symbols in the plant images, such as the block symbols and faceplates of process objects. The user selection service 75 can address the DCS DL 76 in order, for example, to open a faceplate (symbolized by the arrow 88). The display hierarchy (BL) 77 is the business logic of the plant image hierarchy. The display hierarchy (BL) 77 provides the plant image hierarchy for navigation between the plant images and dynamizes this with the group alarm status of the plant images from the alarm-issuing process objects contained therein. The operator can trigger a change of plant image by selecting a plant image in the plant image hierarchy.

Herein, the user selection service 75 checks, in an automated manner, whether the conditions stored in the memory 72 for an instruction for an operator activity are met and, in the event of one of the conditions being met, initiates the output of the instruction by triggering the operator station client 61 accordingly to output a notification (see FIG. 4) or the direct instruction with the aid of the window 51 (see FIG. 5).

In the exemplary embodiment, the condition relates to an occurrence of an alarm. As a result, the user selection service 75 is given access to the alarm management (via the alarm service 73) to register alarms of the configured alarm paths, so that the user selection service 75 can be notified on the triggering of an alarm and can thus present the described instructions for operator activities or notifications by the operator station client 61 in graphical form.

As evident, the described operator activity user selection services can hence be flexibly created, removed, optimized at runtime and also tailored to the respective life cycle of the plant. This is in particular advantageous in the case of modularized plants, which are continuously partially reconfigured during their life cycle by replacing package units.

Consequently, the described association of alarm areas with the user selection services enables better alarm management. Direct loop-ins are possible to improve the efficiency of the respective relevant objects and documents.

However, even without association with alarm areas, the new categories of user selections enabled by the disclosed embodiments of the invention can, for example, be used to document, coordinate and optimize procedures, routine actions, settings, and/or cyclical checks.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control system for a technical plant, the control system comprising:
   at least one operator station server; and
   at least one operator station client connected to the at least one operator station server;
   wherein the at least one operator station server is configured to transmit visualization information to the at least one operator station client;
   wherein the at least one operator station client is configured to utilize the visualization information to generate a graphical presentation for an operator of the technical plant;
   wherein the at least one operator station client is configured, at runtime of the plant, to receive an instruction which is specifiable by the operator for an operator activity relating to the technical plant and a condition for the instruction which is specified by the operator and to transmit said instruction and condition to the at least one operator station server, the condition relating to an internal state of the technical plant and the instruction for the operator activity comprising a guided interaction with the control system; and
   wherein the at least one operator station server is configured to store the instruction and condition received from the at least one operator station client in a memory and to check whether the condition is met.

2. The control system as claimed in claim 1, wherein the instruction relates to at least one of objects and documents of the technical plant which is specifiable by the operator at the runtime of the plant.

3. The control system as claimed in claim 1, wherein the at least one operator station server is configured to modify the visualization information such that the graphical presentation of the at least one operator station client outputs the instruction as the graphical presentation when the condition is met.

4. The control system as claimed in claim 2, wherein the at least one operator station server is configured to modify the visualization information such that the graphical presentation of the at least one operator station client outputs the instruction as the graphical presentation when the condition is met.

5. The control system as claimed in claim 1, wherein the at least one operator station server is configured to modify the visualization information such that the at least one operator station client outputs a notification of the instruction as the graphical presentation when the condition is met.

6. The control system as claimed in claim 2, wherein the at least one operator station server is configured to modify the visualization information such that the at least one operator station client outputs a notification of the instruction as the graphical presentation when the condition is met.

7. The control system as claimed in claim 5, wherein the at least one operator station client is configured to receive a prompt from the operator for an output of the instruction and to transmit said received prompt to the at least one operator station server; and wherein the at least one operator station server is configured to modify the visualization information such that the at least one operator station client outputs the instruction as the graphical presentation after receipt of the prompt.

8. The control system as claimed claim 1, wherein the graphical presentation comprises a plant image with graphical representatives of objects of the technical plant.

9. The control system as claimed in claim 1, wherein the condition represents an event or a logical combination of a plurality of events.

10. The control system as claimed in claim 9, wherein an event represents an occurrence of an alarm.

11. The control system as claimed in claim 10, wherein the alarm relates to an object of the technical plant which is specifiable by the operator at runtime of the technical plant.

12. The control system as claimed in claim 1, wherein the technical plant comprises a production or process plant.

13. A method for operating a control system of a technical plant, the control system including at least one operator station server and at least one operator station client, the at least one operator station server being configured to transmit visualization information to the at least one operator station client, and the at least one operator station client being configured to utilize the visualization information to generate a graphical presentation for an operator of the technical plant, the method comprising:
   a) receiving, from the operator of the technical plant, an instruction for an operator activity relating to the technical plant and a condition for the instruction by the operator station client, the condition relating to an internal state of the technical plant and the instruction for the operator activity comprising a guided interaction with the control system;
   b) transmitting the instruction and the condition from the at least one operator station client to the at least one operator station server;
   c) storing the instruction and the condition in a memory; and
   d) performing a check to determine whether the condition is met by the at least one operator station server.

14. The method as claimed in claim 13, wherein the instruction relates to at least one of objects and documents which are specifiable by the operator at runtime of the technical plant.

15. The method as claimed in claim 13, wherein the at least one operator station server modifies the visualization information such that the at least one operator station client outputs the instruction as the graphical presentation when the condition is met.

16. The method as claimed in claim 14, wherein the at least one operator station server modifies the visualization information such that the at least one operator station client outputs the instruction as the graphical presentation when the condition is met.

17. The method as claimed in claim 13, the at least one operator station server modifies the visualization information such that the at least one operator station client outputs a notification of the instruction as the graphical presentation when the condition is met.

18. The method as claimed in claim 14, the at least one operator station server modifies the visualization information such that the at least one operator station client outputs a notification of the instruction as the graphical presentation when the condition is met.

19. The method as claimed in claim 17, wherein the at least one operator station client receives a prompt from the operator for an output of the instruction and transmits said received prompt to the at least one operator station server; and wherein the at least one operator station server modifies the visualization information such that the at least one operator station client outputs the instruction as the graphical presentation after receipt of the prompt.

20. The method as claimed in claim 14, wherein the technical plant comprises a production or process plant.

\* \* \* \* \*